US012347357B2

(12) United States Patent
Liu et al.

(10) Patent No.: US 12,347,357 B2
(45) Date of Patent: Jul. 1, 2025

(54) SOURCE DRIVER, DISPLAY DRIVING DEVICE, AND DISPLAY DEVICE INCLUDING THE SAME

(71) Applicant: SAMSUNG ELECTRONICS CO., LTD., Suwon-si (KR)

(72) Inventors: Barry Liu, Zhubei (TW); Skaut Su, Hsinchu (TW); Donken Huang, Zhubei (TW)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/436,891

(22) Filed: Feb. 8, 2024

(65) Prior Publication Data

US 2025/0124839 A1 Apr. 17, 2025

(30) Foreign Application Priority Data

Oct. 12, 2023 (KR) ........................ 10-2023-0135757

(51) Int. Cl.
*G09G 3/20* (2006.01)
*G09G 3/3275* (2016.01)
*G09G 3/36* (2006.01)

(52) U.S. Cl.
CPC ......... *G09G 3/2007* (2013.01); *G09G 3/2096* (2013.01); *G09G 3/3275* (2013.01); *G09G 3/3685* (2013.01); *G09G 2310/0243* (2013.01); *G09G 2310/0286* (2013.01); *G09G 2310/0289* (2013.01); *G09G 2310/0291* (2013.01); *G09G 2310/0297* (2013.01); *G09G 2320/0673* (2013.01)

(58) Field of Classification Search
CPC ............... G09G 3/2007; G09G 3/2096; G09G 3/32–3291; G09G 3/36–3696; G09G 2310/0243; G09G 2310/0264; G09G 2310/027–0275; G09G 2310/0286–0297; G09G 2320/0271; G09G 2320/0276; G09G 2320/0673
See application file for complete search history.

(56) References Cited

U.S. PATENT DOCUMENTS 9,842,560 B2 12/2017 Kim et al.
11,043,184 B2 6/2021 An et al.
11,605,353 B2 3/2023 Sang et al.
2007/0273682 A1* 11/2007 Yi ........................ G09G 3/3611 345/211
2011/0148841 A1* 6/2011 Yeo ...................... G09G 3/3688 345/211

(Continued)

*Primary Examiner* — Nathan Danielsen
(74) *Attorney, Agent, or Firm* — Sughrue Mion, PLLC

(57) ABSTRACT

Provided is a source driver including: a gamma voltage generator configured to: output a plurality of first gamma voltages during a first time period, and output a second gamma voltage to a plurality of source lines during a second time period different from the first time period, wherein the gamma voltage generator is connected to the plurality of source lines during the second time period; and a plurality of amplifier areas connected to the plurality of source lines, wherein the plurality of amplifier areas are configured to: output a plurality of data signals based on the plurality of first gamma voltages during the first time period, and be disabled during the second time period.

17 Claims, 10 Drawing Sheets

(56) References Cited

U.S. PATENT DOCUMENTS

| | | | | |
|---|---|---|---|---|
| 2014/0267469 | A1* | 9/2014 | Ryu | G09G 3/20 345/204 |
| 2014/0320465 | A1 | 10/2014 | Oh et al. | |
| 2015/0255042 | A1* | 9/2015 | Oh | G09G 3/20 345/212 |
| 2015/0325200 | A1* | 11/2015 | Rho | G09G 3/20 345/212 |
| 2016/0098966 | A1 | 4/2016 | Kim et al. | |
| 2020/0082781 | A1 | 3/2020 | An et al. | |
| 2020/0388206 | A1* | 12/2020 | Bae | G09G 3/2003 |
| 2021/0350735 | A1* | 11/2021 | Kim | G09G 3/20 |
| 2022/0059036 | A1 | 2/2022 | Sang et al. | |
| 2022/0199005 | A1 | 6/2022 | Kim | |
| 2023/0143180 | A1 | 5/2023 | Song et al. | |

* cited by examiner

SOURCE DRIVER, DISPLAY DRIVING DEVICE, AND DISPLAY DEVICE INCLUDING THE SAME

CROSS REFERENCE TO RELATED APPLICATION

This application is based on and claims priority under 35 U.S.C. § 119 to Korean Patent Application No. 10-2023-0135757 filed on Oct. 12, 2023, in the Korean Intellectual Property Office, the disclosure of which is incorporated by reference herein in its entirety.

BACKGROUND

1. Field

The disclosure relates to a display driving device, a source driver, and a display device including the same.

2. Description of Related Art

Generally, a display panel displays images and provides various visual information to users. A display panel includes a plurality of pixels, each of the plurality of pixels representing light of a predetermined luminance for displaying an image. A display driver IC DDI (Display Driver Integrated Circuit) is used to drive pixels.

To drive the display panel at low power, a variable refresh rate (VRR) mode that varies the frame rate may be used.

In VRR mode, the display driver may display video frames and blank frames. The frame rate may vary depending on the number of image frames and blank frames displayed within one cycle.

SUMMARY

The present disclosure provides a display driving device that displays a blank frame without a separate amplifier, a source driver, and a display device including the same.

The present disclosure also provides a display driving device that displays a blank frame based on a gamma voltage corrected in more steps, a source driver, and a display device including the same.

According to an aspect of the disclosure, a source driver includes: a gamma voltage generator configured to: output a plurality of first gamma voltages during a first time period, and output a second gamma voltage to a plurality of source lines during a second time period different from the first time period, wherein the gamma voltage generator is connected to the plurality of source lines during the second time period; and a plurality of amplifier areas connected to the plurality of source lines, wherein the plurality of amplifier areas are configured to: output a plurality of data signals based on the plurality of first gamma voltages during the first time period, and be disabled during the second time period.

According to an aspect of the disclosure, a display driving device includes: a gamma voltage generator configured to generate a plurality of gamma voltages; an amplifier area configured to generate data signals based on the plurality of gamma voltages and to provide the data signals to a source line; a switch configured to connect the source line and the gamma voltage generator; and a timing controller configured to generate a switch control signal to open the switch for a first time period and close the switch for a second time period, wherein the first time period is different from the second time period.

According to an aspect of the disclosure, a display device includes: a display panel including a source line and pixels connected to the source line; and a display driving device including: a gamma amplifier configured to directly output a tap gamma voltage to the source line during a first time period; and a source amplifier configured to output a data signal to the source line during a second time period different from the first time period, wherein the data signal is generated based on the tap gamma voltage.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Figure 1:
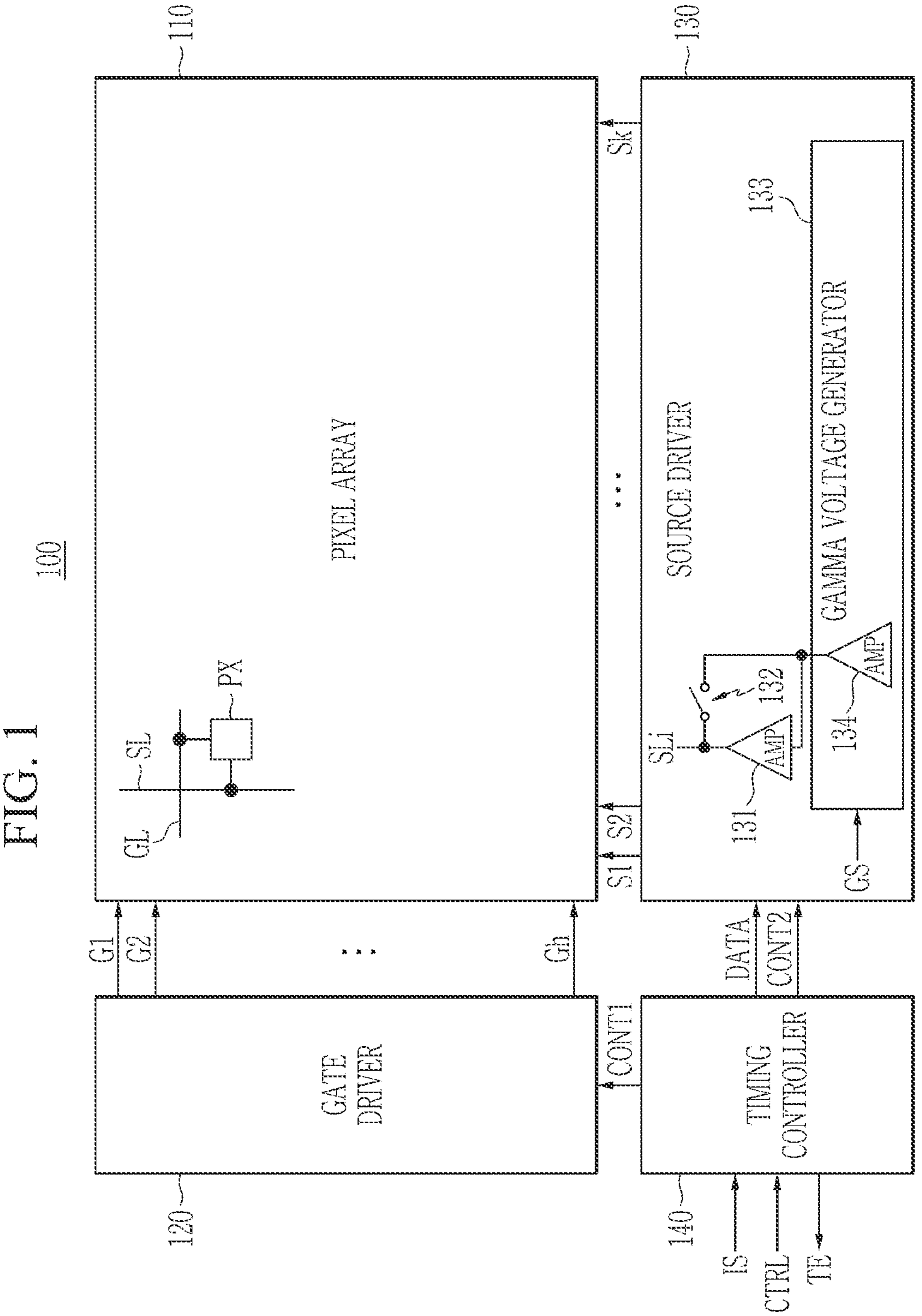
FIG. 1 is an example block diagram of a display device according to an embodiment.

In the following detailed description, only certain embodiments of the present disclosure have been shown and described, simply by way of illustration. As those skilled in the art would realize, the described embodiments may be modified in various different ways, all without departing from the spirit or scope of the present disclosure.

Accordingly, the drawings and description are to be regarded as illustrative in nature and not restrictive. Like reference numerals designate like elements throughout the specification. In flowcharts described with reference to the drawings, an order of operations may be changed, several operations may be merged, some operations may be divided, and specific operations may not be performed.

In addition, an expression written in singular may be construed in singular or plural unless an explicit expression such as "one" or "single" is used. Terms including an ordinal number such as first, second, etc., may be used to describe various configurations, but the configurations are not limited to these terms. These terms may be used for the purpose of distinguishing one component from other configurations.

Terms such as "unit", "module", "member", and "block" may be embodied as hardware or software. As used herein, a plurality of "unit", "module", "member", and "block" may be implemented as a single component or a single "unit", "module", "member", and "block" may include a plurality of components.

It will be understood that when an element is referred to as being "connected" with or to another element, it can be directly or indirectly connected to the other element, wherein the indirect connection includes "connection via a wireless communication network".

Also, when a part "includes" or "comprises" an element, unless there is a particular description contrary thereto, the part may further include other elements, not excluding the other elements.

Throughout the description, when a member is "on" another member, this includes not only when the member is in contact with the other member, but also when there is another member between the two members.

FIG. 1 is an example block diagram of a display device according to an embodiment.

Referring to FIG. 1, the display device 100 according to an embodiment may include a pixel array 110, a gate driver 120, a source driver 130, and a timing controller 140.

A plurality of pixels (PX) for displaying an image may be located in the pixel array 110. The pixel PX may be connected to a corresponding source line SL among a plurality of source lines and a corresponding gate line GL among a plurality of gate lines. The pixel PX may receive a data signal from the source line SL if the gate signal is supplied to the gate line GL. The pixel PX may represent light of a certain brightness corresponding to an input data signal. A plurality of pixels (PX) may display an image in one frame unit.

If the display device 100 is an organic light emitting display device, each of the pixels PX may include a plurality of transistors including a driving transistor and an organic light emitting diode. The driving transistor included in the pixel PX supplies current corresponding to the data signal to the organic light emitting diode, and thus the organic light emitting diode may emit light with a predetermined brightness. If the display device 100 is a liquid crystal display device, each of the pixels PX may include a switching transistor and a liquid crystal capacitor. The pixel PX may control the transmittance of the liquid crystal in response to the data signal so that light of a certain brightness is supplied to the outside.

In FIG. 1, the pixel PX is shown as being connected to one source line (SL) and one gate line (GL), but the connection structure of the signal lines of the pixel PX of the display device according to an embodiment is not limited to this configuration. For example, various signal lines may be additionally connected in accordance with the circuit structure of the pixel PX. In an embodiment, the pixel PX may be implemented in various forms.

The gate driver 120 may provide a plurality of gate signals (G1, G2, . . . , Gh). The plurality of gate signals G1, G2, . . . , Gh may be pulse signals having an enable level and a disable level. A plurality of gate signals G1, G2, . . . , Gh may be applied to a plurality of gate lines GL. If an enable level gate signal is applied to the gate line GL connected to the pixel PX, the data signal applied to the source line SL connected to the pixel PX may be transmitted to the pixel PX. The gate driver 120 may provide a plurality of gate signals G1, G2, . . . , Gh during a plurality of horizontal periods. One frame may include multiple horizontal periods.

The source driver 130 may receive data DATA in the form of a digital signal from the timing controller 140 and convert the data DATA into data signals S1, S2, . . . , Sk in the form of an analog signal. Here, the data DATA may include grayscale information corresponding to each pixel PX for displaying the image signal IS on the pixel array 110. The source driver 130 may transmit a plurality of data signals S1, S2, . . . , Sk to the pixel array 110 according to the source driver control signal CONT2 provided from the timing controller 140. The source driver 130 may be referred to as a data driver.

The source driver 130 may be electrically connected to a plurality of source lines SL. The source driver 130 may transmit a plurality of data signals S1, S2, . . . , Sk to a plurality of electrically connected source lines SL.

The source driver 130 may include an amplifier area 131 and a gamma voltage generator 133. The source driver 130 is not limited to the example shown in FIG. 1, and additional configurations may be included in the source driver 130, and the gamma voltage generator 133 may be configured separately from the source driver 130.

The amplifier area 131 may be electrically connected to the source line (SLi). The amplifier area 131 may transmit a corresponding data signal among the plurality of data signals S1, S2, . . . , Sk to the source line SLi in a first time period. The amplifier area 131 may receive a plurality of gamma voltages. A plurality of gamma voltages may be supplied by the gamma voltage generator 133. The amplifier area 131 may select at least a portion of a plurality of gamma voltages based on image data, amplify the selected gamma voltage, and output the amplified voltage as a data signal to the source line SLi. The data DATA may be sampled in response to the horizontal synchronization signal Hysnc to generate image data. The horizontal synchronization signal Hsync may be a signal having a predetermined period and may be a signal that determines the scan period of the pixels PX connected to each of the gate lines GL. In one or more embodiments, the amplifier area 131 may be disabled in a second time period that is different from the first time period. That is, the operation of the amplifier area 131 may be stopped.

The gamma voltage generator 133 may determine the number of gamma voltages based on the number of bits of image data, and determine the size of each of the plurality of gamma voltages based on the operating conditions of the display device 100 or gamma voltage register settings. In an embodiment, the number of gamma voltages may be determined according to the number of bits of image data. For example, if the image data is 8-bit data, the number of gamma voltages may be 28 or less, and if the image data is 12-bit data, the number of gamma voltages may be 212 or less. That is, if the image data is data having N bits, the plurality of gamma voltages may have 2N different values.

In one or more embodiments, the gamma voltage generator 133 may determine each of the plurality of gamma voltages by selecting at least some of the plurality of reference voltages. The gamma voltage generator 133 may receive the gamma voltage control signal GS and determine the magnitude of each of the plurality of gamma voltages based on the gamma voltage control signal GS. The gamma voltage control signal GS may control the gamma voltage generator 133 so that the voltage magnitudes of the plurality of gamma voltages are changed according to the target luminance level of the to-be displayed image.

The gamma voltage generator 138 may include a gamma amplifier 134 that outputs a gamma voltage. The gamma amplifier 134 may be electrically connected to the source line SLi through a switch 132. In one or more embodiments, the gamma amplifier 134 may output a first gamma voltage based on a first gamma voltage control signal (GS) in a first time period and a second gamma voltage control signal (GS)

in a second time period. The second gamma voltage output in the second time period may be output to the source line SLi through the turned-on switch 132. In the second time period, the amplifier area 131 may be disabled. The first time period may be a time period displaying an image frame, and the second time period may be a time period displaying a blank frame. In one or more embodiments, the first gamma voltage control signal GS and the second gamma voltage control signal GS may have the same number of bits.

Conventionally, in order to display a blank frame, the source driver 130 must have an additional amplifier area and a separate gamma voltage had to be supplied to the additional amplifier area. According to the present disclosure, the display device 100 may display a blank frame without additional amplifiers. Accordingly, since additional amplifiers for displaying a blank frame are not disposed in the source driver 130, a size of the source driver 130 may be reduced in the display device 100 of the present disclosure. In addition, since the voltage generated by the second gamma voltage control signal GS having the same number of bits as the first gamma voltage control signal GS is supplied to the source line SLi, the display device 100 of the present disclosure can display the blank frame based on the gamma voltages controlled in more stages.

The timing controller 140 may receive an image signal (IS) and a driving control signal CTRL from the host device, and control the gate driver 120 and the source driver 130. Here, the host device may be a computing device or system that controls the display device 100 to display an image desired by the user on the pixel array 110 from the outside. The driving control signal CTRL provided from the host device may include control commands and setting data for controlling the gate driver 120 and the source driver 130. The timing controller 140 may control the gate driver 120 and the source driver 130 based on the driving control signal CTRL. For example, the driving control signal CTRL may include a horizontal synchronization signal HSYNC, a vertical synchronization signal VSYNC, a main clock signal MCLK, and a data enable signal DE. The controller 140 may generate data DATA by dividing the image data IS in units of one frame based on the vertical synchronization signal VSYNC, and dividing the image data IS in units of the gate lines GL based on the horizontal synchronization signal HSYNC. The controller 140 may perform, for example, a control of synchronizing the operations of the source driver 130 and the gate driver 120 by transmitting the gate driver control signal CONT1 and the source driver control signal CONT2 to the gate driver 120 and the source driver 130, respectively.

The pixel array 110 and gate driver 120 may be implemented on the same substrate, and the source driver 130 and timing controller 140 may be incorporated into one chip. In one or more embodiments, pixel array 110, gate driver 120, source driver 130, and timing controller 140 may be implemented on the same substrate. In one or more embodiments, the gate driver 120, source driver 130, and timing controller 140 may be incorporated into one chip. The gate driver 120 may be implemented as a separate semiconductor die, chip, or module and connected to the pixel array 110. Additionally, part of the gate driver 120 may be located on the substrate where the pixel array 110 is located, and the remaining part may be included in a separate chip.

Figure 2:
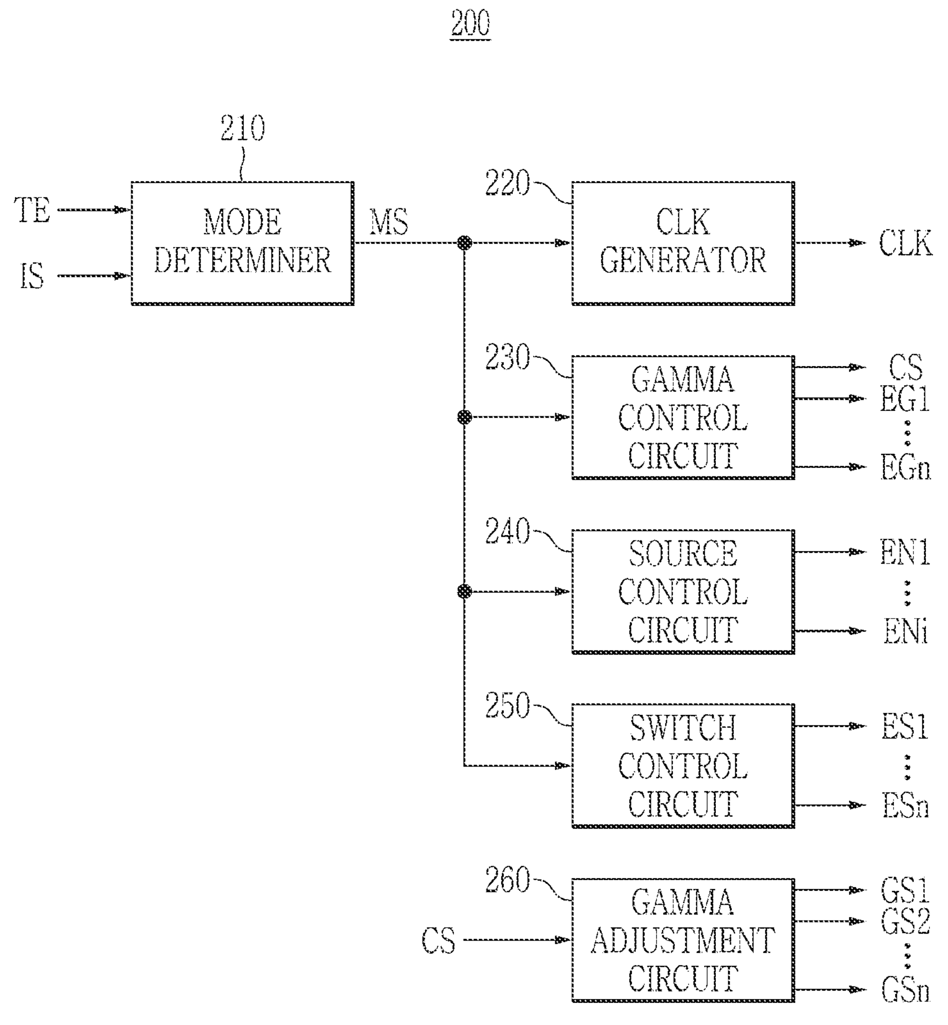
FIG. 2 is a block diagram illustrating a configuration within a timing controller according to an embodiment.

FIG. 2 is a block diagram illustrating some configurations within a timing controller according to an embodiment.

Referring to FIG. 2, the timing controller 200 may receive an image signal IS and an event signal TE related to frame update, and output signals CLK, CS, EG1, . . . , EGn, EN1, . . . , Eni, ES1, . . . , ESn that control the source driver (130 in FIG. 1) based on the image signal IS and the event signal TE. The event signal TE may be a signal notifying the host device that transmission of specific frame data (that is, transmission from the host device to the display device (100 in FIG. 1)) has been completed. In one or more embodiments, if the display device 100 and the host device support a mobile industry processor interface MIPI, the event signal TE may be a tearing effect signal.

In one or more embodiments, the timing controller 200 may determine the first time period and the second time period based on the reception time of the event signal TE and the reception time of the image signal IS. The timing controller 200 may include a mode determiner 210, a clock generator 220, a gamma control circuit 230, a source control circuit 240, and a switch control circuit 250. The timing controller 200 may further include a gamma adjustment circuit 260.

The mode determiner 210 may receive the event signal TE and the image signal IS and generate the mode signal MS based on the event signal TE and the image signal IS. The mode determiner 210 may determine whether the image signal IS is received within a predetermined time from an edge (rising edge or falling edge) of the event signal TE. If the image signal IS is received within a predetermined time from the edge of the event signal TE, the mode determiner 210 may generate a mode signal (MS) corresponding to the first mode. If the image signal IS is not received within a predetermined time from the edge of the event signal TE, the mode determiner 210 may generate a mode signal MS corresponding to the second mode. In one or more embodiments, the voltage level of the mode signal MS corresponding to the first mode and the voltage level of the mode signal MS corresponding to the second mode may be different.

The clock generator 220 may output a clock signal CLK based on the mode signal MS. In one or more embodiments, the clock generator 220 may receive the mode signal MS corresponding to the first mode and output the clock signal CLK. The clock generator 220 may receive the mode signal MS corresponding to the second mode and not output the clock signal CLK.

The gamma control circuit 230 may generate a gamma control signal CS and gamma amplifier control signals EG1, . . . , EGn that control the gamma amplifier (134 in FIG. 1) based on the mode signal MS. The gamma voltage control signal CS may include information about the target luminance level of the image. In one or more embodiments, the gamma control circuit 230 may receive a mode signal MS corresponding to the first mode and generate a gamma control signal CS corresponding to the first mode. The gamma control circuit 230 may receive a mode signal MS corresponding to the second mode and generate a gamma control signal CS corresponding to the second mode. For example, if the gamma control circuit 230 receives the mode signal MS corresponding to the first mode, the gamma control circuit 230 may generate a gamma control signal CS corresponding to the first mode so that the gamma amplifier 134 outputs a first gamma voltage satisfying a 2.2 gamma curve. If the gamma control circuit 230 receives the mode signal MS corresponding to the second mode, the gamma control circuit 230 may generate a gamma control signal CS corresponding to the second mode so that the gamma amplifier 134 outputs a second gamma voltage displaying the blank frame. In one or more embodiments, the gamma control circuit 230 may receive the mode signal MS corresponding to the first mode and generate gamma amplifier control signals EG1, . . . , EGn that enable the gamma amplifiers 134. The gamma control circuit 230 may receive a mode signal MS corresponding to the second mode, and generate gamma amplifier control signals EG1, . . . , EGn that enable at least one of the gamma amplifiers 134 and disable the others.

The source control circuit 240 may generate source amplifier control signals EN1, . . . , ENn that control the amplifier area (131 in FIG. 1) based on the mode signal MS. In one or more embodiments, the source control circuit 240 may receive the mode signal MS corresponding to the first mode and generate source amplifier control signals EN1, . . . , ENn that enable the amplifier area 131. The source control circuit 240 may receive the mode signal MS corresponding to the second mode and generate source amplifier control signals EN1, . . . , ENn that disable the amplifier area 131.

The switch control circuit 250 may generate switch control signals ES1, . . . , ESn that control the switch 132 based on the mode signal MS. In one or more embodiments, the switch control circuit 250 may receive the mode signal MS corresponding to the first mode and generate switch control signals ES1, . . . , ESn that disable the switches 132. The switch control circuit 250 may receive a mode signal MS corresponding to the second mode, and generate switch control signals ES1, . . . , ESn that enable at least one of the switches 132 and disable the others.

At least one switch 132 enabled by switch control signals ES1, . . . , ESn generated by the mode signal MS corresponding to the second mode may be connected to at least one gamma amplifier 134 enabled by gamma amplifier control signals EG1, . . . , EGn generated by the mode signal MS corresponding to the second mode. Accordingly, the second gamma voltage output from at least one gamma amplifier 134 enabled by the gamma amplifier control signals EG1, . . . , EGn may be output to the corresponding source lines SL.

The gamma adjustment circuit 260 may output gamma voltage control signals GS1, GS2, . . . , GSn based on the gamma control signal CS. If the gamma adjustment circuit 260 receives the gamma control signal CS corresponding to the first mode, the gamma adjustment circuit 260 may output gamma voltage control signals GS1, GS2, . . . , GSn corresponding to the first mode. If the gamma adjustment circuit 260 receives the gamma control signal CS corresponding to the second mode, the gamma adjustment circuit 260 may output gamma voltage control signals GS1, GS2, . . . , GSn corresponding to the second mode. The gamma adjustment circuit 260 will be described with reference to FIG. 3.

Figure 3:
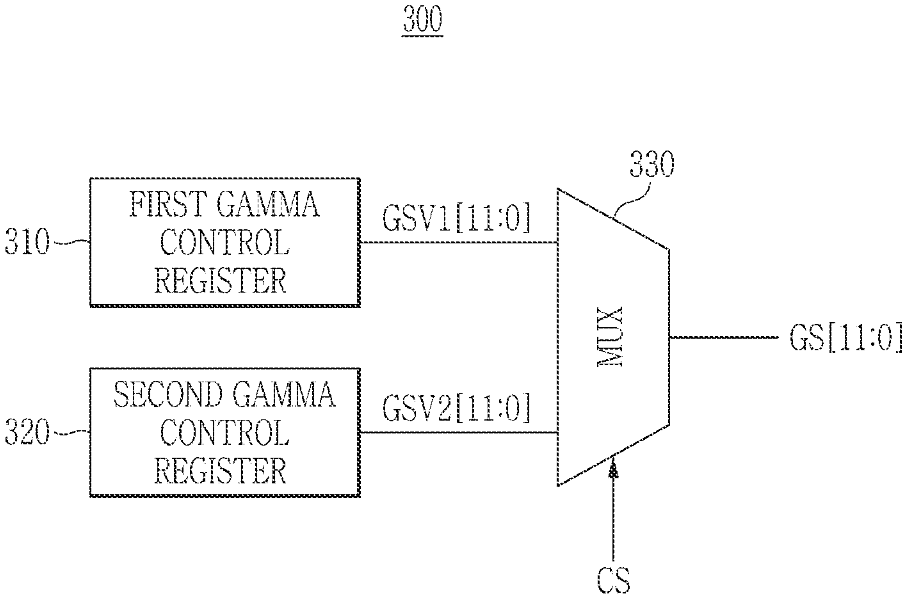
FIG. 3 is a block diagram illustrating a partial configuration of a gamma adjustment circuit according to an embodiment.

FIG. 3 is a block diagram illustrating a partial configuration of a gamma adjustment circuit according to an embodiment.

Referring to FIG. 3, the gamma adjustment circuit 300 may include a first gamma control register 310, a second gamma control register 320, and a multiplexer (MUX) 330. The first gamma control register 310 may store a gamma voltage setting value GSV1[11:0] corresponding to the first mode. The second gamma control register 320 may store a gamma voltage setting value GSV2[11:0] corresponding to the second mode. The multiplexer 330 may output a gamma voltage setting value GSV1[11:0] corresponding to the first mode or a gamma voltage setting value GSV2[11:0] corresponding to the second mode as a gamma voltage control signal GS[11:0] based on the gamma control signal CS. In one or more embodiments, there may be a plurality of first gamma control registers 310 and/or second gamma control registers 320, and the multiplexer 330 may be a selector that selects a gamma voltage control signal GSV1[11:0] or GSV2[11:0] from one of the plurality of first and second gamma control registers 310 and 320.

Figure 4:
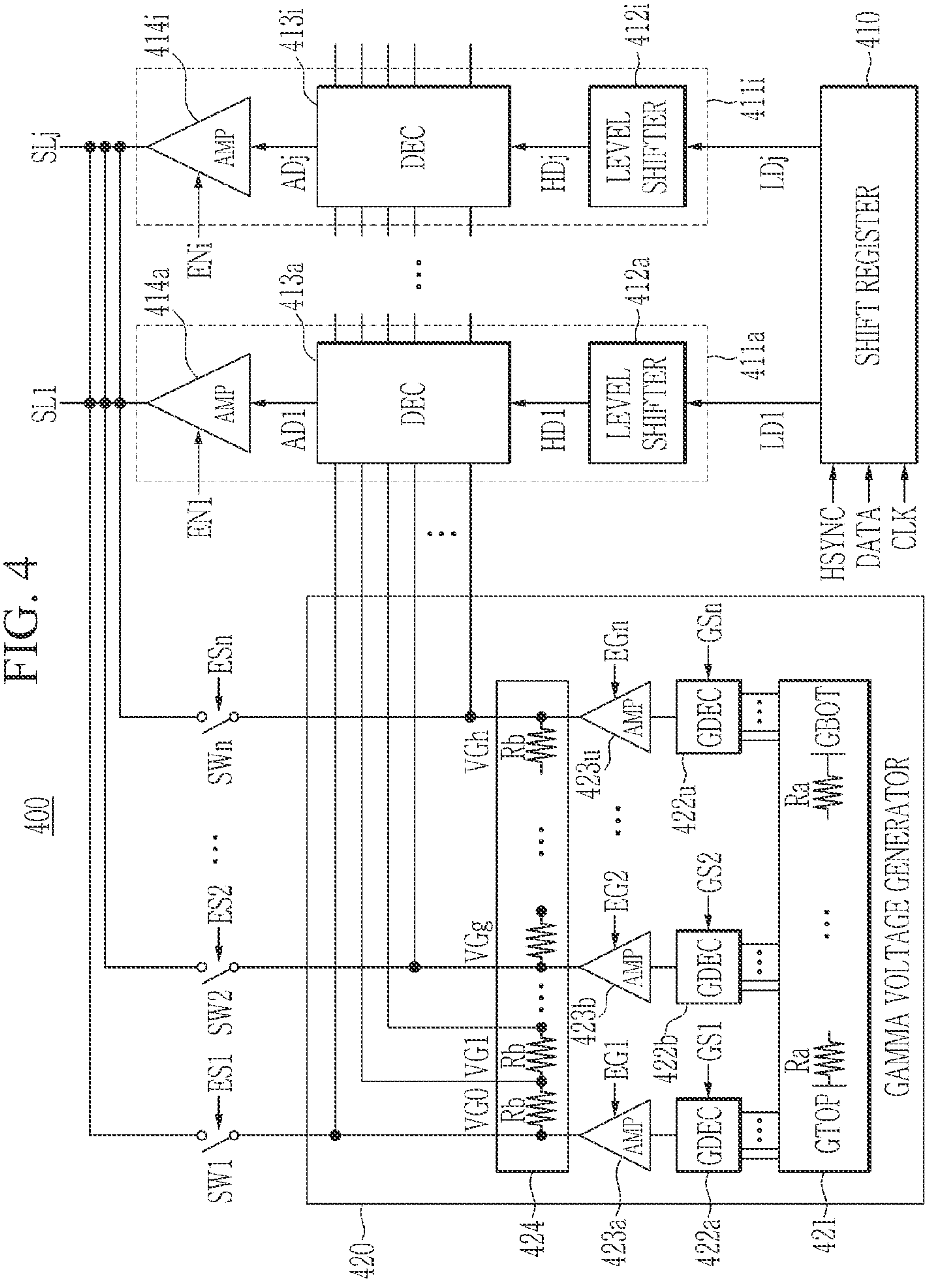
FIG. 4 is a block diagram illustrating a configuration of a source driver according to an embodiment.

FIG. 4 is a block diagram illustrating some configurations of a source driver according to an embodiment.

Referring to FIG. 4, the source driver 400 may include a shift register (SHIFT REGISTER) 410, a plurality of amplifier areas 411*a*, . . . , 411*i*, and a gamma voltage generator (GAMMA VOLTAGE GENERATOR) 420.

The shift register 410 may sample the data DATA in response to the horizontal synchronization signal Hysnc and the clock signal CLK, and provide the sampled image data LD1, . . . , LDj to the plurality of amplifier areas 411*a*, . . . , 411*i*. The data DATA may include a plurality of source data corresponding to the plurality of source lines SL1, . . . , SLj, and each of the plurality of source data may include a plurality of bits. The shift register 410 may generate image data LD1, . . . , LDj having a plurality of bits by sampling each of the plurality of bits of the data DATA. If the clock signal CLK is transmitted to the shift register 410 at a disable level, the shift register 410 may stop sampling the data DATA.

Each of the plurality of amplifier areas 411*a*, . . . , 411*i* may include a level shifter (LEVEL SHIFTER) (412*a*/412*i*), a decoder (DEC) (413*a*/413*i*), and an amplifier (amplifier) (414*a*/414*i*). Hereinafter, the description will be made with reference to the amplifier area 411*a* connected to the source line SL1.

The level shifter 412*a* may level-shift the image data LD1. The level shifter 412*a* may receive video data LD1 at a low voltage level and output decoded video data HD1 at a high voltage level to the decoder 413*a*. In one or more embodiments, the image data LD1 may include a plurality of bits, and the level shifter 412*a* may generate decoded image data HD1 having a plurality of bits by level-shifting the plurality of bits of the image data LD1. The level shifter 412*a* may receive the digital signal LD1 and provide decoded image data HD1 whose level is shifted to swing between target voltage levels to the decoder 413*a*.

The decoder 413*a* may output an analog signal AD1 corresponding to the decoded image data HD1. The decoder 413*a* may receive a plurality of gamma voltages VG0, VG1, . . . , VGh along with the decoded video data HD1. A plurality of gamma voltages VG0, VG1, . . . , VGh may be supplied by the gamma voltage generator 138. The decoder 413*a* may select at least some of the plurality of gamma voltages VG0, VG1, . . . , VGh based on the decoded image data HD1 and transmit the selected gamma voltage as an input voltage to the amplifier 135 through the output port.

The amplifier 414*a* may output the input voltage received from the decoder 413*a* as a data signal to the pixel connected to the corresponding source line SL1. Amplifier 414*a* may or may not operate based on source amplifier control signal EN1. For example, if the source amplifier control signal EN1 is at an enable level, the amplifier 414*a* may be turned on and output a data signal. If the source amplifier control signal EN1 is at a disable level, the amplifier 414*a* may be turned off.

The gamma voltage generator 420 may determine the number of a plurality of gamma voltages VG0, VG1, . . . , VGh based on the number of bits of the decoded image data HD1, and determine the size of each of the plurality of gamma voltages VG0, VG1, . . . , VGh based on the operating conditions of the display device 100 or gamma voltage register settings. In an embodiment, the number of gamma voltages VG0, VG1, . . . , VGh may be determined according to the number of bits of image data. For example, if the decode video data (HD1) is 8-bit data, the number of multiple gamma voltages VG0, VG1, . . . , VGh may be 28 or less, and if the decode video data (HD1) is 10-bit data, the number of gamma voltages VG0, VG1, . . . , VGh may be 210 or less. That is, if the decoded image data HD1 is data having N bits, the plurality of gamma voltages VG0, VG1, . . . , VGh may have 2N different sizes. The gamma voltage generator 420 may determine the size of each of the plurality of gamma voltages VG0, VG1, . . . , VGh by selecting at least some of the plurality of reference voltages.

The gamma voltage generator 420 may include a first resistor string 421, a plurality of gamma decoders 422*a*, 422*b*, . . . , 422*u*, a plurality of gamma amplifiers 423*a*, 423*b*, . . . , 423*u*, and a second resistor string 424.

The first resistor string 421 may set the range of the gamma voltages VG0, . . . , VGh. The first resistor string 421 may include a plurality of first resistors Ra connected in series between the maximum gamma voltage GTOP and the minimum gamma voltage GBOT. The voltage between the maximum and minimum gamma voltages GTOP and GBOT may be divided into a plurality of reference gamma voltages by the plurality of first resistors Ra. The plurality of first resistors Ra may have the same resistance value. The maximum gamma voltage GTOP is the maximum voltage that the gamma voltages VG0, . . . , VGh can have, the minimum gamma voltage (GBOT) is the minimum voltage that the gamma voltages (VG0, . . . , VGh) can have, each of the maximum and minimum gamma voltages (GTOP and GBOT) may be set based on the driving voltage (or power supply voltage) applied to the gamma voltage generator 420.

The gamma decoder 422*a* may select one of the reference gamma voltages divided by the first resistor string 421 based on the gamma voltage control signal GS1. The gamma amplifier 423*a* may output a selected one of the reference gamma voltages divided by the first resistor string 421. In one or more embodiments, one of the divided reference gamma voltages selected by the gamma decoder 422*a* may be set to the gamma voltage (VG0) of the lowest gray level. Each of the gamma decoders 422*b*, . . . , 422*u* may select one of the reference gamma voltages divided by the first resistor string 421 based on the gamma voltage control signals GS2, . . . , GSn, and the gamma amplifiers 423*b*, . . . , 423*u* may output voltages selected by the gamma decoders 422*b*, . . . , 422*u*, respectively. In one or more embodiments, the voltage selected by the gamma decoder 422*u* and output through the gamma amplifier 423*u* is set to the gamma voltage (VGh) of the maximum gray level, voltages output through the gamma amplifiers 423*b*, . . . may be set to gamma voltages VGg of intermediate gray levels. Each of the gamma decoders 422*a*, 422*b*, . . . , 422*u* may be implemented as a 12-bit decoder, but this is an example and is not limited thereto.

In one or more embodiments, the tap gamma voltages VG0, VGg, . . . , VGh output through the plurality of gamma amplifiers 423*a*, 423*b*, . . . , 423*u* may be set to have substantially equal intervals from each other. The plurality of gamma amplifiers 423*a*, 423*b*, . . . , 423*u* may or may not operate based on the gamma amplifier control signals EG1, . . . , EGn. For example, if the gamma amplifier control signals EG1, EG2, . . . , EGn are at an enable level, the plurality of gamma amplifiers 423*a*, 423*b*, . . . , 423*u* may be turned on and output the tap gamma voltages VG0, VGg, . . . , VGh. If the gamma amplifier control signals EG2, . . . , EGn are at a disable level and the gamma amplifier control signal EG1 is at an enable level, the plurality of gamma amplifiers 423*b*, . . . , 423*u* may be turned off, and the gamma amplifier 423*a* may be turned on. The turned-on gamma amplifier 423*a* may output the tap gamma voltage VG0.

A plurality of gamma amplifiers 423*a*, 423*b*, . . . , 423*u* may be connected to the second resistor string 424. Additionally, a plurality of gamma amplifiers 423*a*, 423*b*, . . . , 423*u* may be connected to a plurality of switches SW1, SW2, . . . , SWn.

The second resistor string 424 may include a plurality of second resistors (Rb). Within the gamma voltage range set in the first resistor string 421, the gamma voltages VG0, VG1, . . . , VGh may be generated. The plurality of second resistors Rb may have the same resistance value. The gamma voltages VG0, VG1, . . . , VGh may be provided to the decoders 413*a*, . . . , 413*i*.

The plurality of switches SW1, SW2, . . . , SWn may connect one of the plurality of gamma amplifiers 423*a*, 423*b*, . . . , 423*u* to the source lines (SL1, . . . , SLj). If the switch control signals ES1, . . . , ESn are at a disable level, the plurality of switches SW1, SW2, . . . , SWn may be turned off. If the switch control signals ES2 . . . , ESn are at the disable level and the switch control signal ES1 is at the enable level, the plurality of switches SW2, . . . , SWn may be turned off and the switch (SW1) may be turned on. The turned-on switch SW1 may output the tap gamma voltage VG0 transmitted from the corresponding gamma amplifier 423*a* to the source lines SL1, . . . , SLj.

In one or more embodiments, in the first mode: the clock signal CLK may be provided to the shift register 410; the source amplifier control signals EN1, . . . , ENn having an enable level may be provided to a plurality of source amplifiers 414*a*, . . . , 414*i*; the gamma amplifier control signals EG1, EG2, . . . , EGn having an enable level may be provided to a plurality of gamma amplifiers 423*a*, 423*b*, . . . , 423*u*; the gamma voltage control signals GS1, GS2, . . . , GSn corresponding to the first mode may be provided to a plurality of gamma decoders 422*a*, 422*b*, . . . , 422*u*; and, the switch control signals ES1, . . . , ESn having a disable level may be provided to a plurality of switches SW1, SW2, . . . , SWn. Accordingly, the data signals based on the data DATA may be applied to the source lines SL1, . . . , SLj.

In one or more embodiments, in the second mode: the clock signal CLK may be not provided to the shift register 410; the source amplifier control signals EN1, . . . , ENn having a disable level may be provided to a plurality of source amplifiers 414*a*, . . . , 414*i*; the plurality of gamma amplifier control signals EG1, EG2, . . . , EGn, at least one of which has an enable level, may be provided to the plurality of gamma amplifiers 423*a*, 423*b*, . . . , 423*u*; the gamma voltage control signals GS1, GS2, . . . , GSn corresponding to the second mode may be provided to a plurality of gamma decoders 422*a*, 422*b*, . . . , 422*u*; and the plurality of switch control signals ES1, . . . , ESn, at least one of which has an enable level, may be provided to the plurality of switches SW1, SW2, . . . , SWn.

The switch control signal having an enable level, among the plurality of switch control signals ES1, . . . , ESn, may be applied to the switch connected to the gamma amplifier(s) to which at least one of the plurality of gamma amplifier control signals EG1, EG2, . . . , EGn having an enable level is input. Accordingly, the gamma voltage selected to display the blank frame may be applied as data signals to the source lines SL1, . . . , SLj. That is, in the second mode, all source amplifiers 414*a*, . . . , 414*i* may be turned off, the operation of the shift register 410 may be stopped, and the gamma amplifiers except at least one gamma amplifier(s) may be turned off, thereby reducing the power consumption required to display a blank frame. According to the present disclosure, since the gamma amplifier included in the gamma voltage generator 420 is used, the blank frame can be displayed without an additional amplifier. Additionally, according to the present disclosure, the gamma voltage selected for displaying the blank frame may be selected using the gamma voltage control signal having substantially the same bits as the gamma voltage control signal used to display the normal frame (i.e., the gamma voltage control signal corresponding to the first mode).

Figure 5:
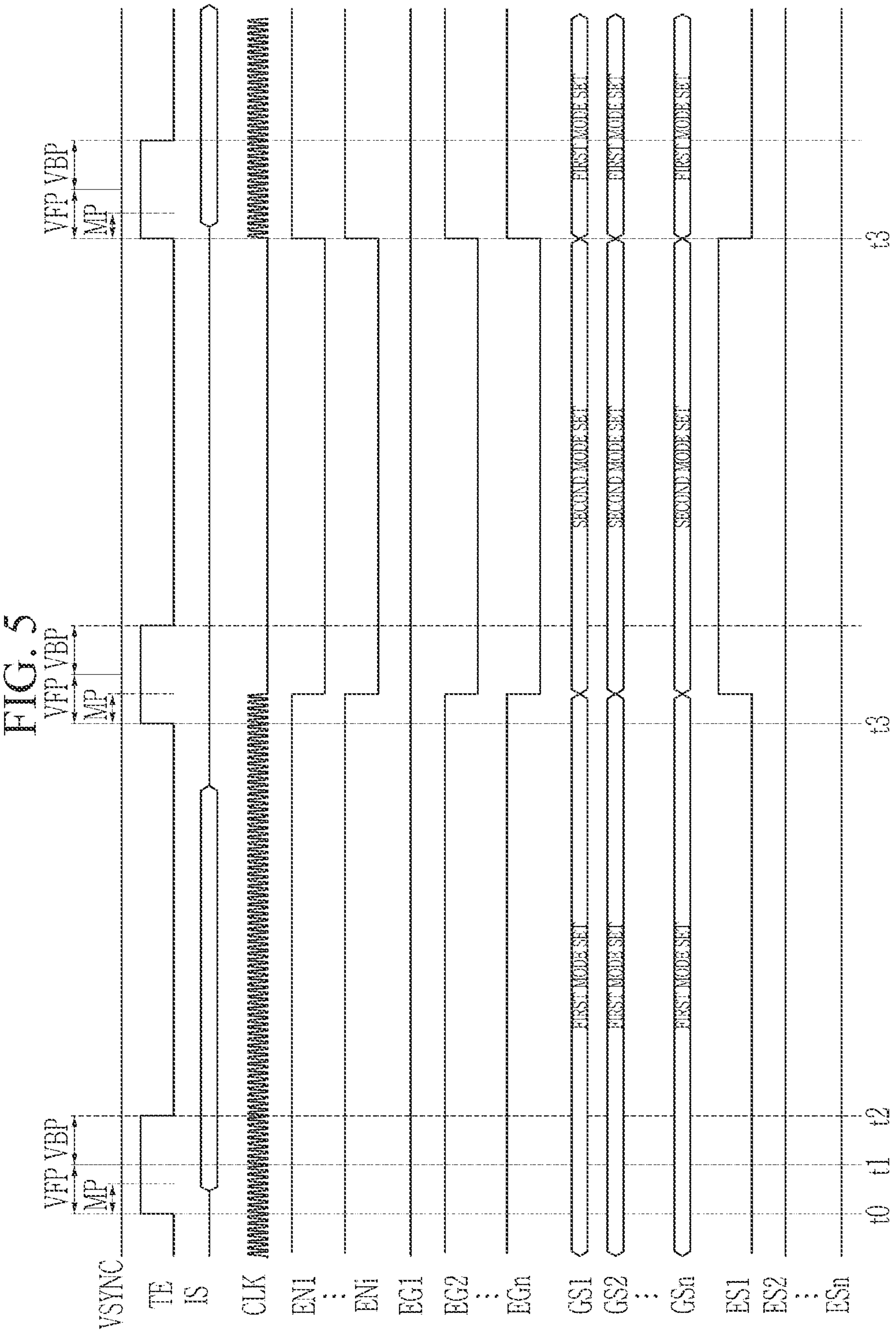
FIG. 5 is a timing diagram illustrating signals input to and output from a timing controller and source driver according to an embodiment.

FIG. 5 is a timing diagram illustrating signals input and output to a timing controller and source driver according to an embodiment.

Referring to FIG. 5, at time to, the timing controller (140 in FIG. 1) may change the level of the event signal TE. The event signal TE may be a signal indicating that transmission of a specific frame has been completed. The image signal IS for the next frame may be received within a predetermined period MP from the falling edge of the event signal TE (that is, at time to).

At time t1, the timing controller 140 may generate a vertical synchronization signal VSYNC. A vertical synchronization signal VSYNC may be generated at time t1 if the Vertical Front Porch (VFP) has passed from time to.

At time t2, if the Vertical Back Porch (VBP) has elapsed from time t1, the timing controller 140 may change the level of the event signal TE.

Since the image signal IS for the next frame is received within a predetermined period MP from the falling edge of the event signal TE (i.e., at time t0), the timing controller 140 may generate a mode signal (MS) corresponding to the first mode and output a clock signal CLK. The timing controller 140 may generate the source amplifier control signals EN1, . . . , ENn and the gamma amplifier control signals EG1, . . . , EGn having an enable level, and the switch control signals ES1, ES2, . . . , ESn having a disable level. The gamma adjustment circuit (260 in FIG. 2) may output gamma voltage control signals GS1, GS2, . . . , GSn corresponding to the first mode (FIRST MODE SET). Accordingly, the display device (100 in FIG. 1) may display an image according to the image signal IS.

At time t3, if the transmission of the image signal IS is completed, the timing controller 140 may change the level of the event signal TE. The image signal IS for the next frame may not be received within a predetermined period MP from the falling edge of the event signal TE (that is, at time t3).

Since the image signal IS for the next frame is not received within a predetermined period MP from the falling edge of the event signal TE (i.e., at time t3), the timing controller 140 may generate a mode signal MS corresponding to the second mode and stop outputting the clock signal CLK. The timing controller 140 may generate the source amplifier control signals EN1, . . . , ENn and the gamma amplifier control signals EG2, . . . , EGn having a disable level, and the switch control signals ES2, . . . , ESn having a disable level. The timing controller 140 may output the gamma amplifier control signal EG1 and the corresponding switch control signal ES1 at an enable level. The gamma adjustment circuit 260 may output the gamma voltage control signals GS1, GS2, . . . , GSn corresponding to the second mode (SECOND MODE SET). Accordingly, the display device 100 may display a blank frame image. This will be described with reference to FIG. 6.

Figure 6:
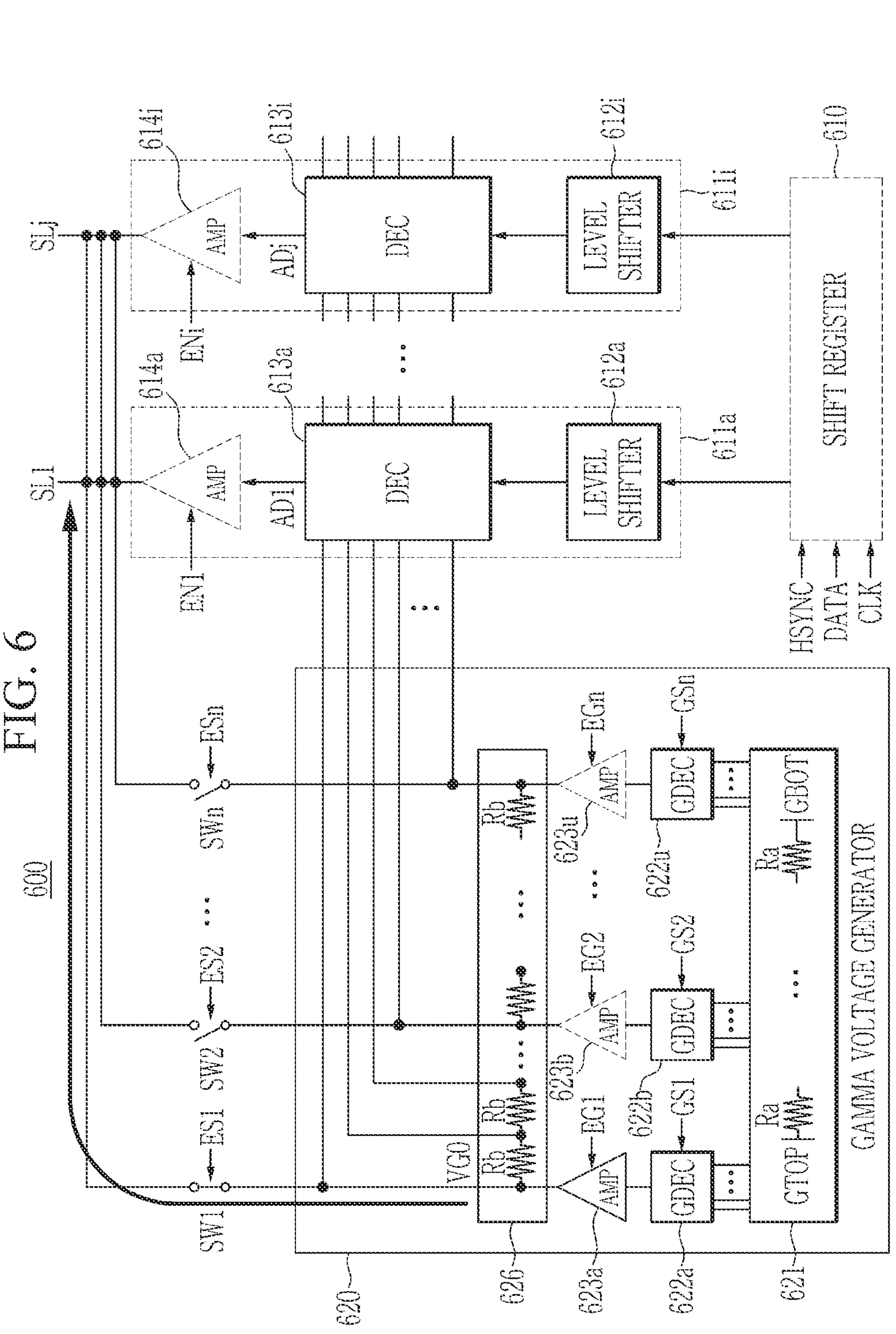
FIG. 6 is a block diagram illustrating a partial configuration of a source driver that displays a blank frame according to an embodiment.

FIG. 6 is a block diagram illustrating a partial configuration of a source driver 600 that displays a blank frame according to an embodiment.

Referring to FIG. 6, to the extent FIG. 6 is similar to FIG. 4, description of redundant components is omitted.

As shown in FIG. 6, the gamma voltage generator 620 may provide a tap gamma voltage VG0 to the source lines SL1, . . . , SLj (note that, similar to gamma voltage generator 420, gamma voltage generator 620 may include a first resistor string 621, a plurality of gamma decoders 622*a*, 622*b*, . . . , 622*u*, a plurality of gamma amplifiers 623*a*, 623*b*, . . . , 623*u*, and a second resistor string 626. If the image signal IS for the next frame is not received, the output of the clock signal CLK may be stopped and the operation of the shift register 610 may be stopped (note that, similar to shift register 410, shift register 610 of FIG. 6 may include a plurality of amplifier areas 611*a*, . . . , 611*i*; similarly, each of the plurality of amplifier areas 611*a*, . . . , 611*i* may include a level shifter (LEVEL SHIFTER) (612*a*/612*i*), a decoder (DEC) (613*a*/613*i*)). The source amplifiers 614*a*, . . . , 614*i* may stop operating based on receiving the source amplifier control signals EN1, . . . , ENn at the disable level. Based on the gamma voltage control signals GS1, GS2, . . . , GSn corresponding to the second mode (SECOND MODE SET), each of the gamma decoders 622*a*, 622*b*, . . . , 622*u* may output a tap gamma voltage. The gamma amplifiers 623*b*, 623*u* may stop operating based on the gamma amplifier control signals EG2, . . . , EGn having a disable level. The gamma amplifier 623*a* may output the tap gamma voltage VG0 based on to the gamma amplifier control signal EG1 having an enable level. The plurality of switches SW2, . . . , SWn may be opened based on a switch control signal SW2, . . . , SWn having a disable level. The switch SW1 may be closed based on the switch control signal SW1 having an enable level. The switch SW1 may connect the gamma amplifier 623*a* and the source lines SL1, . . . , SLj. During a blank frame, the tap gamma voltage VG0 output from the gamma amplifier 623*a* may be applied as a data signal to the source lines SL1, . . . , SLj.

Figure 7:
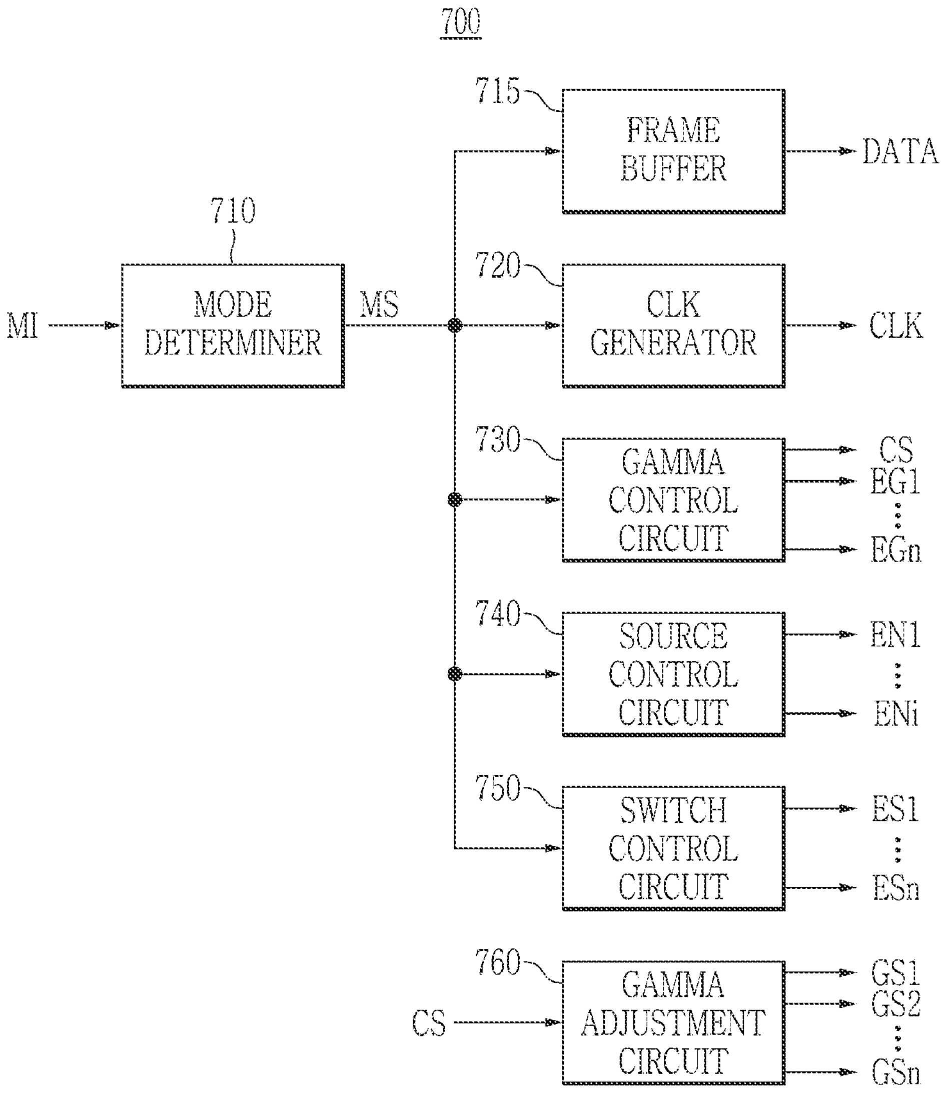
FIG. 7 is a block diagram illustrating a configuration within a timing controller according to an embodiment.

FIG. 7 is a block diagram illustrating one or more configurations within a timing controller according to an embodiment.

Referring to FIG. 7, the timing controller 700 may receive mode information MI, and output signals CLK, CS, EG1, . . . , EGn, EN1, . . . , Eni, ES1, . . . , ESn) for controlling the source driver (130 in FIG. 1) based on the mode information MI. The mode information (MI) may include information for the host device to adjust the frame rate of the display device (100 in FIG. 1). The frame rate may correspond to the number of frame images that the display device 100 displays per unit time.

The timing controller 700 may determine the first time period and the second time period based on mode information MI that adjusts the frame rate. The timing controller 700 may include a mode determiner 710, a frame buffer 715, a clock generator 720, a gamma control circuit 730, a source control circuit 740, and a switch control circuit 750. The timing controller 700 may further include a gamma adjustment circuit 760. Hereinafter, description of configurations that are the same or similar to those of FIG. 2 among the configurations of FIG. 7 will be omitted.

The mode determiner 710 may receive the mode information MI and generate the mode signal MS based on the mode information MI. The mode determiner 710 may determine, based on the mode information MI, the mode as a first mode for displaying an image based on a first frame rate or a second mode for displaying an image based on a second frame rate. The second frame rate is assumed to be lower than the first frame rate. If determining the mode as the first mode based on mode information MI, the mode determiner 710 may generate a mode signal MS corresponding to the first mode, if determining the mode as the second mode based on mode information MI, the mode determiner 710 may generate a mode signal MS corresponding to the second mode. In one or more embodiments, the voltage level of the mode signal MS corresponding to the first mode and the voltage level of the mode signal MS corresponding to the second mode may be different.

The frame buffer 715 may output a frame data DATA based on the mode signal (MS). For example, if receiving the mode signal MS corresponding to the first mode, the frame buffer 715 may output the frame data DATA to satisfy the first frame rate. If receiving the mode signal MS corresponding to the second mode, the frame buffer 715 may output the frame data DATA to satisfy the second frame rate. In one or more embodiments, the frame buffer 715 may output the frame data DATA corresponding to the second frame rate. For example, the frame rate of the first mode may be 60 Hz, and the frame rate of the second mode may be 6 Hz. If receiving the mode signal MS of the first mode, the frame buffer 715 may transmit the frame data DATA so that 60 image frames are displayed within 1 second. If receiving the mode signal MS of the second mode, the frame buffer 715 may transmit the frame data DATA so that 6 image frames are displayed per second. The frame buffer 715 may output blank frame data and frame data DATA according to the image signal IS at a ratio of 9:1, so that nine blank frames and one image frame are displayed during a unit period in the second mode. In one or more embodiments, the frame buffer 715 may not output frame data (DATA) or may output frame data (DATA) at a ratio of 9:1, so that nine blank frames and one image frame are displayed during a unit period. That is, the frame buffer 715 may not output frame data DATA corresponding to 9 frames, but may output frame data DATA corresponding to 1 frame.

The clock generator 720 may output the clock signal CLK based on the mode signal MS. In one or more embodiments, the clock generator 720 may receive the mode signal MS corresponding to the first mode and output the clock signal CLK. The clock generator 720 may receive the mode signal MS corresponding to the second mode, and may cease outputting the clock signal CLK or may output the clock signal CLK at a rate corresponding to the second mode. For example, the clock generator 720 may cease outputting the clock signal CLK in response to nine frames, but may output the clock signal CLK in response to one frame, so that nine blank frames and one image frame are displayed during a unit period in the second mode.

The gamma control circuit 730 may generate a gamma control signal CS and gamma amplifier control signals EG1, . . . , EGn that control the gamma amplifier (134 in FIG. 1) based on the mode signal MS. In one or more embodiments, the gamma control circuit 730 may receive a mode signal MS corresponding to the first mode and generate a gamma control signal CS corresponding to the first mode. The gamma control circuit 730 may receive the mode signal MS corresponding to the second mode, and output the gamma control signal CS corresponding to the first mode and the gamma control signal CS corresponding to the second mode at a rate corresponding to the second mode. For example, if the gamma control circuit 730 receives the mode signal MS corresponding to the second mode, the gamma control circuit 730 may output the gamma control signal CS corresponding to the second mode in response to nine frames, and output the gamma control signal CS corresponding to the first mode in response to one frame, so that nine blank frames and one image frame are displayed during a unit period in the second mode.

The source control circuit 740 may generate source amplifier control signals EN1, . . . , ENn that control the amplifier area (131 in FIG. 1) based on the mode signal MS. In one or more embodiments, the source control circuit 740 may receive a mode signal MS corresponding to the first mode, and generate source amplifier control signals EN1, . . . , ENn that enable the amplifier area 131. The source control circuit 740 may receive a mode signal (MS) corresponding to the second mode, and output source amplifier control signals EN1, . . . , ENn for disabling the amplifier area 131 and source amplifier control signals EN1, . . . , ENn for enabling the amplifier area 131 at a ratio corresponding to the second mode. For example, the source control circuit 740 may output the source amplifier control signals EN1, . . . , ENn that disable the amplifier area 131 in response to nine frames and the source amplifier control signals EN1, . . . , ENn that enable the amplifier area 131 in response to one frame, so that nine blank frames and one image frame are displayed during a unit period.

The switch control circuit 750 may generate switch control signals ES1, . . . , ESn that control the switch 132 based on the mode signal MS. In one or more embodiments, the switch control circuit 750 may receive a mode signal MS corresponding to the first mode and generate switch control signals ES1, . . . , ESn that disable the switches 132. The switch control circuit 750 may receive the mode signal MS corresponding to the second mode, and output switch control signals ES1, . . . , ESn that enable at least one of the switches 132 and disable the others and switch control signals ES1, . . . , ESn that disable the switches 132 at a rate corresponding to the second mode. For example, the switch control circuit 750 may output the switch control signals ES1, . . . , ESn that enable at least one of the switches 132 and disable the others in response to nine frames, and switch control signals ES1, . . . , ESn that disable the switches 132 in response to one frame, so that nine blank frames and one image frame are displayed during a unit period.

Figure 8:
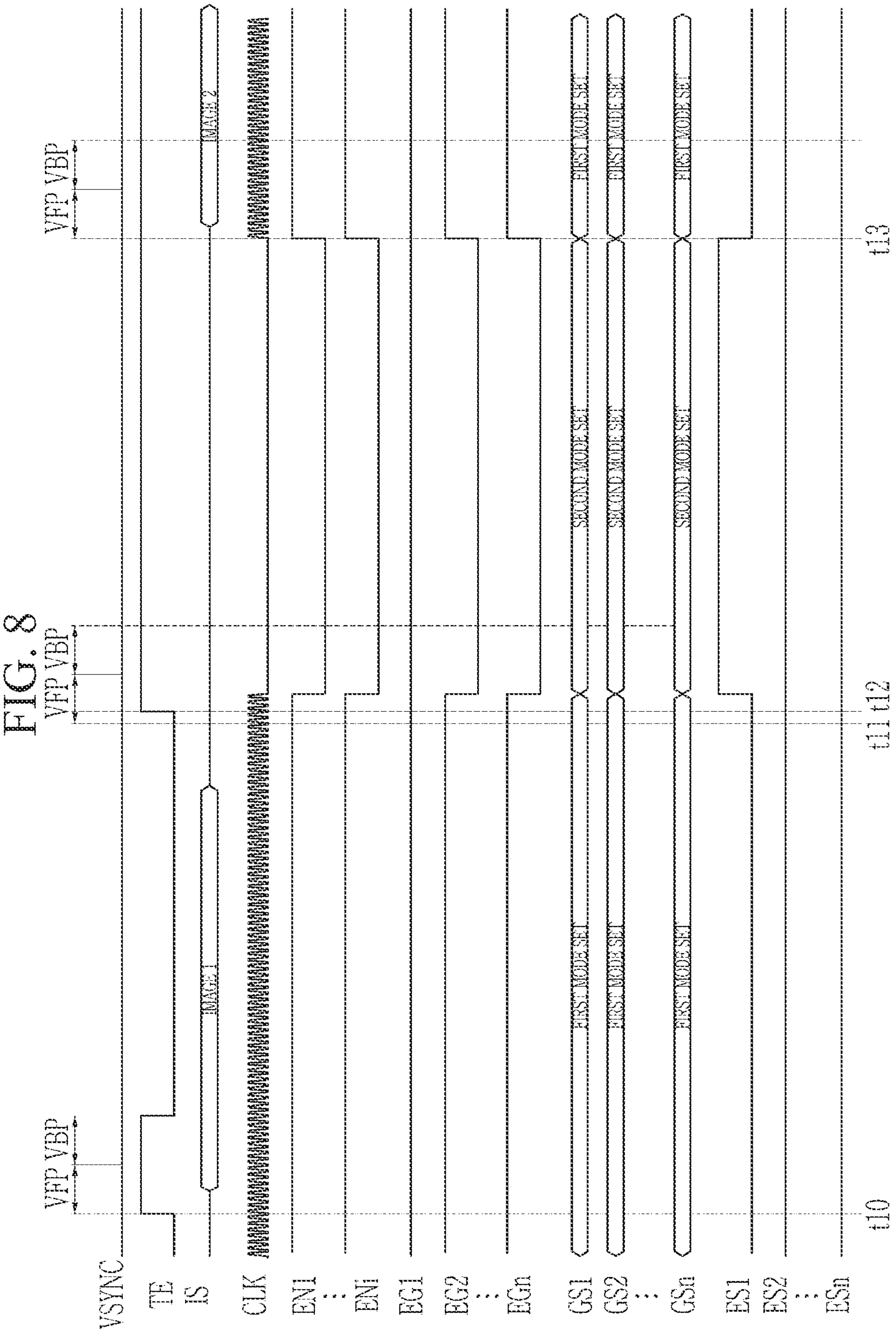
FIG. 8 is a timing diagram illustrating signals input to and output from a timing controller and source driver according to an embodiment.

FIG. 8 is a timing diagram illustrating signals input and output to a timing controller and source driver according to an embodiment.

Referring to FIG. 8, at time t10, the timing controller (140 in FIG. 1) may change the level of the event signal TE. The mode information MI may be changed after the falling edge (that is, at time t10) of the event signal TE. Hereinafter, the mode information MI will be described assuming that it is a signal with two voltage levels representing two modes. In addition, the mode information MI may be multi-bit data including information about the frame rate. The description will be made assuming that the mode information MI having the disable level indicates the first mode, the mode information MI having the enable level indicates the second mode, the frame rate of the first mode is 60 Hz and the frame rate of the second mode is 30 Hz. Accordingly, in the second mode, the display device 100 may alternately display normal image frames and blank frames.

In a period (t10 to t11) when the mode information MI indicates the first mode, the timing controller 140 may generate a mode signal MS corresponding to the first mode and output a clock signal CLK. The timing controller 140 may generate source amplifier control signals EN1, . . . , ENn and the gamma amplifier control signals EG1, . . . , EGn having an enable level, and the switch control signals ES1, ES2, . . . , ESn having a disable level. The gamma adjustment circuit (260 in FIG. 2) may output gamma voltage control signals GS1, GS2, . . . , GSn corresponding to the first mode (FIRST MODE SET). Accordingly, the display device (100 in FIG. 1) may display an image according to the image signal (IMAGE 1).

At time t11, if the transmission of the image signal IS is completed, the timing controller 140 may change the level of the event signal TE. The mode information MI may be changed after the falling edge (that is, at time t11) of the event signal TE. For example, at time t12, the mode information MI may change from a disable level to an enable level.

In a period in which the mode information MI indicates the second mode (e.g., the period after t12), the timing controller 140 may generate the mode signal MS corresponding to the second mode. According to the mode signal MS corresponding to the second mode, the timing controller 140 may stop outputting the clock signal CLK or output the clock signal CLK by alternating frames.

The timing controller 140 may, alternately in frames, generate the source amplifier control signals EN1, . . . , ENn and the gamma amplifier control signals EG2, . . . , EGn having a disable level, the switch control signals ES2, . . . , ESn having a disable level, the gamma amplifier control signal EG1 having an enable level and a corresponding switch control signal ES1 having an enable level, or generate the source amplifier control signals EN1, . . . , ENn and the gamma amplifier control signals EG1, . . . , EGn having an enable level, and the switch control signals ES1, ES2, . . . , ESn having a disable level. The gamma adjustment circuit 260 may, alternately in frames, output the gamma voltage control signals GS1, GS2, . . . , GSn corresponding to the second mode (SECOND MODE SET), or the gamma voltage control signals GS1, GS2, . . . , GSn corresponding to the first mode (FIRST MODE SET). Accordingly, the display device 100 may, alternately in frames, display a blank frame image or a normal frame image based on the image signal (IMAGE 2).

Figure 9:
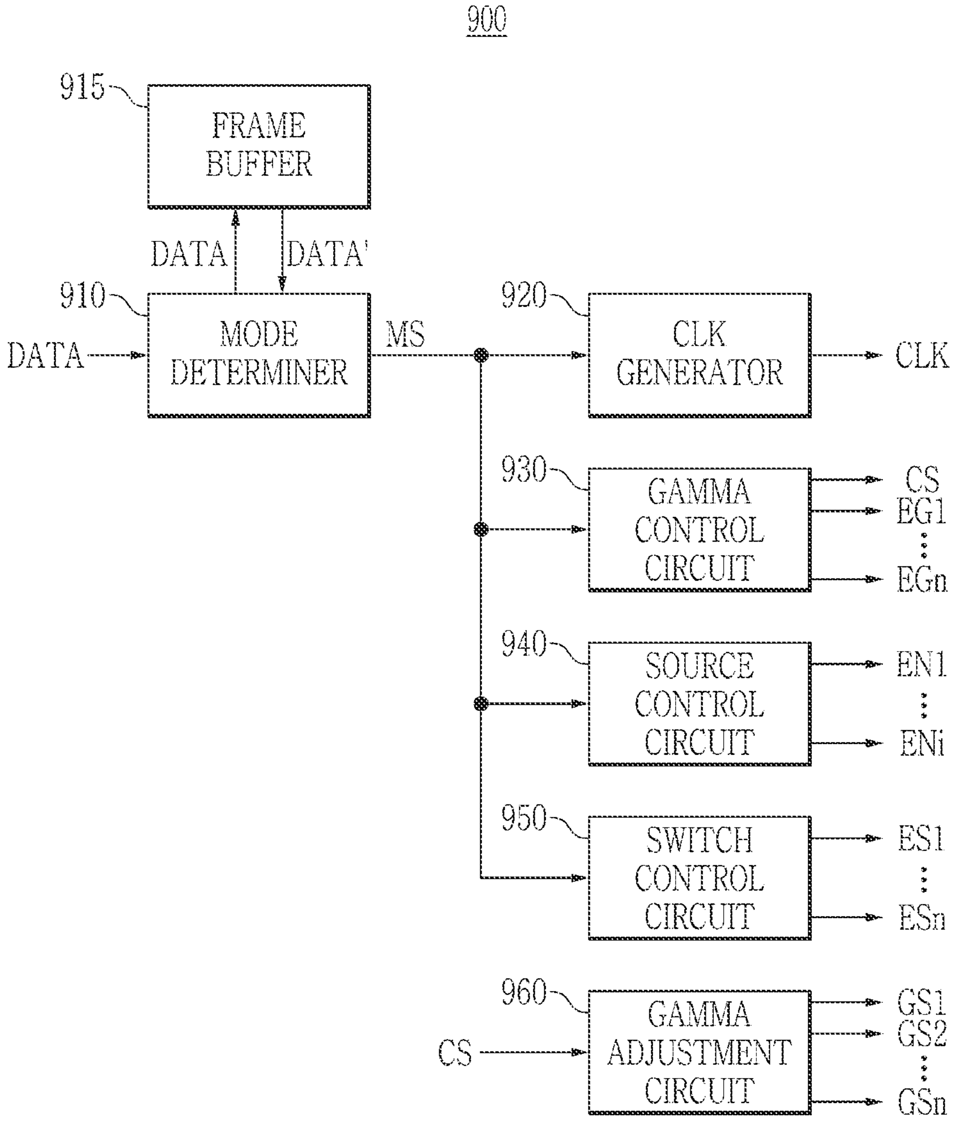
FIG. 9 is a block diagram illustrating a configuration within a timing controller according to an embodiment.

FIG. 9 is a block diagram illustrating some configurations within a timing controller according to an embodiment.

Referring to FIG. 9, the timing controller 900 may receive current frame data DATA, and output signals CLK, CS, EG1, . . . , EGn, EN1, . . . , Eni, and ES1, . . . , ESn that control the source driver (130 in FIG. 1) based on the current frame data DATA and the previous frame data DATA' stored in the frame buffer 905, The timing controller 900 may include a mode determiner 910, a frame buffer 915, a clock generator 920, a gamma control circuit 930, a source control circuit 940, and a switch control circuit 950. The timing controller 900 may further include a gamma adjustment circuit 960. Hereinafter, description of configurations that are the same or similar to those of FIGS. 2 and 7 among the configurations of FIG. 9 will be omitted.

The mode determiner 910 may receive the current frame data DATA and receive the previous frame data DATA' from the frame buffer 915. The mode determiner 910 may generate a mode signal MS by comparing the current frame data DATA and the previous frame data DATA'. The mode determiner 910 may compare the current frame data DATA and the previous frame data DATA', and determine the mode of the display device (100 in FIG. 1) as a first mode for displaying a moving image or a second mode for displaying a still image. It is assumed that the first mode is a mode for displaying an image based on the first frame rate, and the second mode is a mode for displaying an image at a second frame rate that is lower than the first frame rate. If the mode determiner 910 determines the mode as the first mode, the mode determiner 910 may generate a mode signal MS corresponding to the first mode, if the mode determiner 910 determines the mode as the second mode, the mode determiner 910 may generate a mode signal MS corresponding to the second mode. In one or more embodiments, the voltage level of the mode signal MS corresponding to the first mode and the voltage level of the mode signal MS corresponding to the second mode may be different.

The clock generator 920 may output the clock signal CLK based on the mode signal MS. In one or more embodiments, the clock generator 920 may receive the mode signal MS corresponding to the first mode and output the clock signal CLK. The clock generator 920 may receive the mode signal MS corresponding to the second mode, and may not output the clock signal CLK or may output the clock signal CLK at a rate corresponding to the second mode. For example, the clock generator 920 may not output the clock signal CLK in response to nine frames, but may output the clock signal CLK in response to one frame, so that nine blank frames and one image frame are displayed during a unit period in the second mode.

The gamma control circuit 930 may generate a gamma control signal CS and gamma amplifier control signals EG1, . . . , EGn that control the gamma amplifier (134 in FIG. 1) based on the mode signal MS. In one or more embodiments, the gamma control circuit 930 may receive a mode signal MS corresponding to the first mode and generate a gamma control signal CS corresponding to the first mode. The gamma control circuit 930 may receive the mode signal MS corresponding to the second mode, and output the gamma control signal CS corresponding to the first mode and the gamma control signal CS corresponding to the second mode at a rate corresponding to the second mode.

For example, if the gamma control circuit 930 receives the mode signal MS corresponding to the second mode, the gamma control circuit 930 may output the gamma control signal CS corresponding to the second mode in response to nine frames, and output the gamma control signal CS corresponding to the first mode in response to one frame, so that nine blank frames and one image frame are displayed during a unit period in the second mode.

The source control circuit 940 may generate source amplifier control signals EN1, . . . , ENn that control the amplifier area (131 in FIG. 1) based on the mode signal MS. In one or more embodiments, the source control circuit 940 may receive a mode signal MS corresponding to the first mode, and generate source amplifier control signals EN1, . . . , ENn that enable the amplifier area 131. The source control circuit 940 may receive a mode signal (MS) corresponding to the second mode, and output source amplifier control signals EN1, . . . , ENn for disabling the amplifier area 131 and source amplifier control signals EN1, . . . , ENn for enabling the amplifier area 131 at a ratio corresponding to the second mode. For example, the source control circuit 940 may output the source amplifier control signals EN1, . . . , ENn that disable the amplifier area 131 in response to nine frames and the source amplifier control signals EN1, . . . , ENn that enable the amplifier area 131 in response to one frame, so that nine blank frames and one image frame are displayed during a unit period.

The switch control circuit 950 may generate switch control signals ES1, . . . , ESn that control the switch 132 based on the mode signal MS. In one or more embodiments, the switch control circuit 950 may receive a mode signal MS corresponding to the first mode and generate switch control signals ES1, . . . , ESn that disable the switches 132. The switch control circuit 950 may receive the mode signal MS corresponding to the second mode, and output switch control signals ES1, . . . , ESn that enable at least one of the switches 132 and disable the others and switch control signals ES1, . . . , ESn that disable the switches 132 at a rate corresponding to the second mode. For example, the switch control circuit 950 may output the switch control signals ES1, . . . , ESn that enable at least one of the switches 132 and disable the others in response to nine frames, and switch control signals ES1, . . . , ESn that disable the switches 132 in response to one frame, so that nine blank frames and one image frame are displayed during a unit period.

Figure 10:
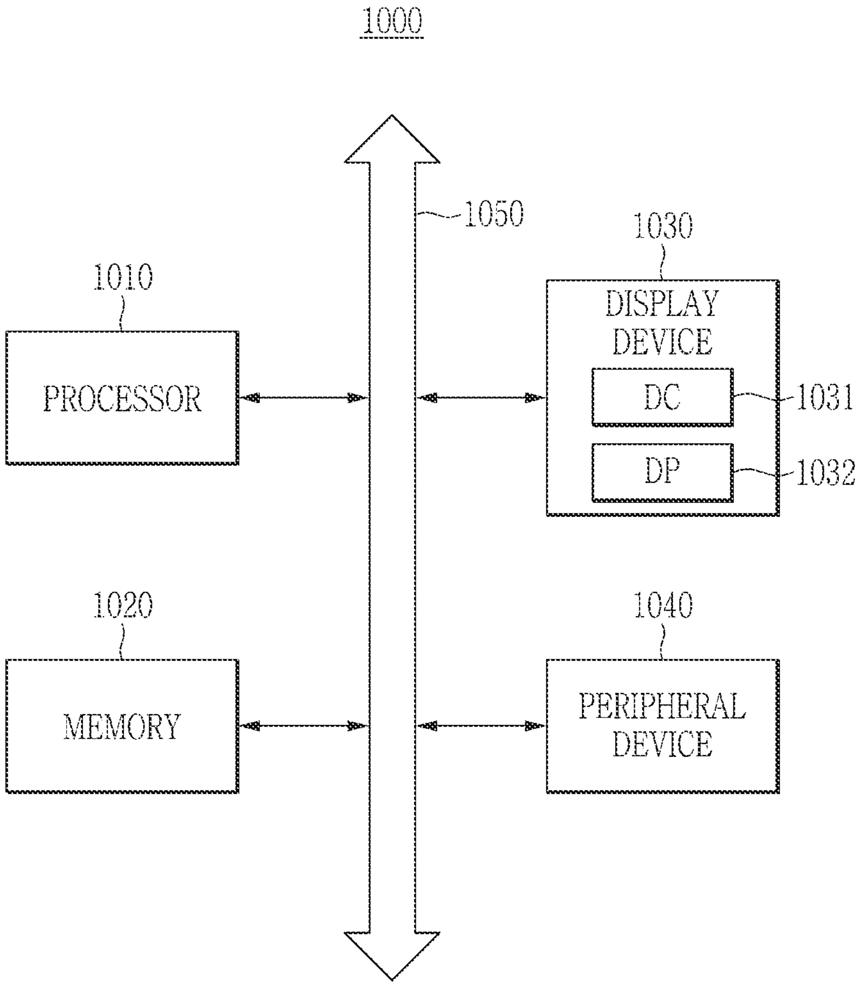
FIG. 10 is a diagram illustrating a display system according to an embodiment.

FIG. 10 is a diagram for explaining a display system according to an embodiment.

Referring to FIG. 10, the display system 1000 according to an embodiment may include a processor 1010, a memory 1020, a display device 1030, and a peripheral device 1040 that are electrically connected to the system bus 1050.

The processor 1010 may control the input and output of data from the memory 1020, the display device 1030, and the peripheral device 1040, and may perform image processing of image data transmitted between the corresponding devices.

The memory 1020 may include volatile memory such as dynamic random access memory (DRAM) and/or nonvolatile memory such as flash memory. The memory 1020 may include volatile memory such as dynamic random access memory (DRAM) and/or nonvolatile memory such as flash memory. The memory 1020 may be configured with a DRAM, a phase-change random access memory (PRAM), a magnetic random access memory (MRAM), a resistive random access memory (ReRAM), a ferroelectric random access memory (FRAM), a NOR flash memory, a NAND flash memory, and a fusion flash memory (for example, a memory in which a static random access memory (SRAM) buffer, a NAND flash memory, and a NOR interface logic are combined). The memory 1020 may store image data acquired from the peripheral device 1040 or may store image signals processed by the processor 1010.

The display device 1030 includes a driving circuit 1031 and a display panel 1032, and the driving circuit 1031 may display image data applied through the system bus 1050 on the display panel 1032. The driving circuit 1031 may include a gamma amplifier that is electrically connected to the source line and directly outputs a tapped gamma voltage at a specific time period, such as a blank frame period, and a source amplifier that outputs the data signal generated based on the tap gamma voltage of the gamma amplifier to the source line in other time periods. The gamma amplifier may be the gamma amplifier described in FIGS. 1 to 9.

The peripheral device 1040 may be a device that converts moving images or still images, such as a camera, scanner, or webcam, into electrical signals. Image data acquired through the peripheral device 1040 may be stored in the memory 1020 or displayed on the panel 1032 in real time.

The display system 1000 may be installed in a mobile electronic product such as a smartphone, but is not limited thereto, and may be installed in various types of electronic products that display images.

Although an example embodiment of the disclosure has been described in detail, the scope of the disclosure is not limited by the example embodiment. Various changes and modifications using the basic concept of the disclosure defined in the accompanying claims by those skilled in the art shall be construed to belong to the scope.

In one or more example embodiments, each constituent component or combination of two or more constituent components described with reference to FIGS. 1 to 10 may be implemented with a digital circuit, a programmable or non-programmable logic device or array, an application specific integrated circuit (ASIC), and the like.

Although an example embodiment of the disclosure has been described in detail, the scope of the disclosure is not limited by the example embodiment. Various changes and modifications using the basic concept of the disclosure defined in the accompanying claims by those skilled in the art shall be construed to belong to the scope. While this disclosure has been described in connection with what is presently considered to be practical example embodiments, it is to be understood that the disclosure is not limited to the disclosed example embodiments. On the contrary, it is intended to cover various modifications and equivalent arrangements included within the spirit and scope of the appended claims.

What is claimed is:

1. A source driver comprising:

a gamma voltage generator comprising:

a plurality of gamma amplifiers configured to output a plurality of tap gamma voltages; and a first resistor string configured to divide the plurality of tap gamma voltages to generate a plurality of first gamma voltages;

a plurality of amplifier areas connected to a plurality of source lines;

a second resistor string configured to divide a maximum gamma voltage and a minimum gamma voltage and to generate a plurality of reference gamma voltages; and a plurality of gamma decoders, wherein the gamma voltage generator is configured to:

output the plurality of first gamma voltages during a first time period, and output a second gamma voltage to the plurality of source lines during a second time period different from the first time period, wherein the gamma voltage generator is connected to the plurality of source lines during the second time period, wherein each of the plurality of amplifier areas is configured to:

output a plurality of data signals based on the plurality of first gamma voltages during the first time period, and be disabled during the second time period, wherein each of the plurality of gamma decoders is configured to:

receive corresponding reference gamma voltages from among the plurality of reference gamma voltages, and output one of the corresponding reference gamma voltages to a gamma amplifier among the plurality of gamma amplifiers based on a plurality of gamma voltage control signals, and wherein a number of bits of the plurality of gamma voltage control signals input to the plurality of gamma decoders during the first time period and a number of bits of the plurality of gamma voltage control signals input to the plurality of gamma decoders during the second time period are substantially the same.

2. The source driver of claim 1, further comprising:

a plurality of switches configured to connect the plurality of source lines and the plurality of gamma amplifiers.

3. The source driver of claim 2, wherein the plurality of gamma amplifiers are configured to be enabled during the first time period, and wherein a gamma amplifier among the plurality of gamma amplifiers is configured to be enabled during the second time period and the remaining gamma amplifiers of the plurality of gamma amplifiers are configured to be disabled during the second time period.

4. The source driver of claim 3, wherein the plurality of switches are configured to be in an open state during the first time period, and wherein a switch, of the plurality of switches, connected to the gamma amplifier configured to be enabled during the second time period is configured to be in a closed state during the second time period and the remaining switches of the plurality of switches are configured to be in the open state during the second time period.

5. The source driver of claim 1, further comprising:

a shift register configured to:

sample image data based on a clock signal and provide the sampled image data to the plurality of amplifier areas during the first time period, and stop sampling the image data during the second time period.

6. The source driver of claim 5, wherein each of the plurality of amplifier areas comprises:

a level shifter configured to receive video data and to output decoded image data obtained by level shifting the video data;

a decoder configured to output at least one first gamma voltage of the plurality of first gamma voltages based on the decoded image data; and a source amplifier configured to amplify the at least one first gamma voltage received from the decoder and to output the amplified at least one first gamma voltage received from the decoder to a corresponding source line among the plurality of source lines.

7. The source driver of claim 6, wherein the source amplifier is configured to be enabled during the first time period and to be disabled during the second time period.

8. A display driving device comprising:

a gamma voltage generator configured to generate a plurality of gamma voltages, the gamma voltage generator comprising:

a plurality of gamma amplifiers configured to output a plurality of tap gamma voltages;

a first resistor string configured to divide a maximum gamma voltage and a minimum gamma voltage and to generate a plurality of reference gamma voltages; and a plurality of gamma decoders;

an amplifier area configured to generate data signals based on the plurality of gamma voltages and to provide the data signals to a source line;

a switch configured to connect the source line and the gamma voltage generator; and a timing controller configured to;

generate a switch control signal to open the switch for a first time period and close the switch for a second time period, wherein the first time period is different from the second time period, and generate a plurality of gamma voltage control signals with first values in the first time period and second values in the second time period, and wherein each gamma decoder of the plurality of gamma decoders is configured to:

receive corresponding reference gamma voltages among the plurality of reference gamma voltages, and output one of the corresponding reference gamma voltages to a gamma amplifier from among the plurality of gamma amplifiers based on a gamma voltage control signal from among the plurality of gamma voltage control signals; and wherein a number of bits of the plurality of gamma voltage control signals input to the plurality of gamma decoders during the first time period and a number of bits of the plurality of gamma voltage control signals input to the plurality of gamma decoders during the second time period are substantially the same.

9. The display driving device of claim 8, wherein the timing controller is further configured to generate a plurality of gamma amplifier control signals that during the first time period enable the plurality of gamma amplifiers during the first time period, and during the second time period enable one of the plurality of gamma amplifiers and disables the remainder of the plurality of gamma amplifiers.

10. The display driving device of claim 9, wherein the first values differ from the second values.

11. The display driving device of claim 10, wherein the plurality of gamma voltage control signals comprises a plurality of first gamma voltage control signals generated during the first time period and a plurality of second gamma voltage control signals generated during the second time period, and wherein the display driving device further comprises:

a first gamma control register configured to store a first gamma voltage control signal from among the plurality of gamma voltage control signals;

a second gamma control register configured to store a second gamma voltage control signal from among the plurality of gamma voltage control signals, wherein the second gamma voltage control signal comprises a same number of bits as the first gamma voltage control signal; and a multiplexer configured to selectively output the plurality of first gamma voltage control signals and the plurality of second gamma voltage control signals based on a gamma control signal.

12. The display driving device of claim 8, further comprising:

a shift register configured to sample image data based on a clock signal and to provide the sampled image data to the amplifier area, wherein the timing controller is further configured to generate the clock signal during the first time period and to stop generating the clock signal during the second time period.

13. The display driving device of claim 12, wherein the amplifier area comprises:

a level shifter configured to receive video data and to output decoded image data obtained by level shifting the video data;

a decoder configured to output at least one of the plurality of gamma voltages based on the decoded image data; and a source amplifier configured to amplify the at least one gamma voltage received from the decoder and to output the amplified at least one gamma voltage to the source line, and wherein the timing controller is further configured to generate a source amplifier control signal that enables the source amplifier during the first time period and disables the source amplifier during the second time period.

14. The display driving device of claim 8, wherein the timing controller is further configured to:

receive an event signal and an image signal, and determine the first time period and the second time period based on a reception time of the event signal and a reception time of the image signal.

15. The display driving device of claim 8, wherein the timing controller is further configured to:

receive mode information for adjusting a frame rate, and determine the first time period and the second time period based on the mode information.

16. The display driving device of claim 8, wherein the timing controller is further configured to determine the first time period and the second time period based on current frame data and previous frame data.

17. A display device comprising:

a display panel comprising a source line and pixels connected to the source line; and a display driving device comprising:

a resistor string configured to divide a maximum gamma voltage and a minimum gamma voltage and to generate a plurality of reference gamma voltages;

a gamma decoder;

a gamma amplifier configured to directly output a tap gamma voltage from among a plurality of tap gamma voltages to the source line during a first time period; and a source amplifier configured to output a data signal to the source line during a second time period different from the first time period, wherein the data signal is generated based on the tap gamma voltage, wherein the gamma decoder is configured to:

receive corresponding reference gamma voltages from among the plurality of reference gamma voltages, and output one of the corresponding reference gamma voltages to the gamma amplifier based on a gamma voltage control signal;

wherein a number of bits of the gamma voltage control signal input to the gamma decoder during the first time period and a number of bits of the gamma voltage control signal input to the gamma decoder during the second time period are substantially the same.

* * * * *